(12) United States Patent
Gesner et al.

(10) Patent No.: US 7,808,617 B2
(45) Date of Patent: Oct. 5, 2010

(54) DUAL RESOLUTION, DUAL RANGE SENSOR SYSTEM AND METHOD

(75) Inventors: Eric G. Gesner, Webster, NY (US); David B. Kay, Rochester, NY (US)

(73) Assignee: Quality Vision International, Inc., Rochester, NY (US)

( * ) Notice: Subject to any disclaimer, the term of this patent is extended or adjusted under 35 U.S.C. 154(b) by 402 days.

(21) Appl. No.: 11/856,158

(22) Filed: Sep. 17, 2007

(65) Prior Publication Data

US 2009/0073419 A1 Mar. 19, 2009

(51) Int. Cl.
*G01C 3/00* (2006.01)
(52) U.S. Cl. .......................... 356/3; 356/406
(58) Field of Classification Search ............. 356/3–22, 356/614, 622, 624
See application file for complete search history.

(56) References Cited

U.S. PATENT DOCUMENTS

| | | | |
|---|---|---|---|
| 4,489,408 A | 12/1984 | Verhoven et al. | |
| 4,712,205 A | 12/1987 | Smid et al. | |
| 5,255,171 A | 10/1993 | Clark | |
| 5,270,780 A * | 12/1993 | Moran et al. | 356/5.04 |
| 5,406,541 A | 4/1995 | Kay | |
| 5,589,938 A | 12/1996 | Deck | |
| 5,790,242 A * | 8/1998 | Stern et al. | 356/4.04 |
| 5,790,258 A * | 8/1998 | Mitome et al. | 356/401 |
| 6,070,132 A | 5/2000 | Ishimoto | |
| 6,288,786 B1 | 9/2001 | Rudd et al. | |
| 6,518,996 B1 | 2/2003 | Polidor et al. | |
| 6,781,699 B2 | 8/2004 | Dunn et al. | |
| 2005/0200847 A1 * | 9/2005 | Chen et al. | 356/419 |

FOREIGN PATENT DOCUMENTS

| | | |
|---|---|---|
| EP | 0177108 A1 | 4/1986 |
| JP | 4148808 A | 5/1992 |
| JP | 6018213 A | 1/1994 |
| JP | 10132605 A | 5/1998 |

OTHER PUBLICATIONS

International Search Report and Written Opinion for related application No. PCT/US2008/71945.

* cited by examiner

*Primary Examiner*—Tarifur Chowdhury
*Assistant Examiner*—Tara S Pajoohi
(74) *Attorney, Agent, or Firm*—Stephen B. Salai, Esq.; Thomas B. Ryan, Patent Agent; Harter Secrest & Emery LLP

(57) ABSTRACT

A distance detecting arrangement employs at least two sensors having different ranges and resolutions of operation. Embodiments disclosed contemplate at least four modes of operation. In a first mode, only one sensor is employed. In a second mode, a longer range and lower resolution sensor is employed until a threshold value of distance is reached, at which point a shorter range and higher resolution sensor is employed. In a third mode, both the longer range and shorter range sensors are employed simultaneously. In a fourth mode, a low resolution profile is used to rescan the object with the high resolution sensor to provide a high resolution profile measurement. Embodiments facilitate the method disclosed by including a beam redirecting apparatus and preferably include a servo position system that can move the sensors and the object relative to each other.

23 Claims, 6 Drawing Sheets

DUAL RESOLUTION, DUAL RANGE SENSOR SYSTEM AND METHOD

CROSS-REFERENCE TO RELATED APPLICATIONS

None applicable.

BACKGROUND AND SUMMARY

Laser or optically based non-contact range sensor systems are used in dimensional metrology, such as the system disclosed in U.S. Pat. No. 6,288,786 B1, the disclosure of which is hereby incorporated by reference. These sensors generally have a limited range of operation and resolution within that range. The range of such a system is typically defined as the linear distance for which the sensor provides a useful distance measurement. The axial resolution of the sensor is usually defined as the smallest distance within the sensor's range that can be resolved by the sensor. Many of these sensors are used to measure distance along the vertical axis, usually the Z axis, but they can be set up to measure along any axis of choice.

There are several types of range sensor systems, and each sensor type has a range to resolution numerical ratio. This ratio can be a few hundred, or as high as a few thousand, depending on the design. Some companies claim an even higher ratio, but only by using a good deal of averaging while taking a measurement from a high quality very smooth mirror surface. An example of a device with which range sensors are used is a Coordinate Measuring Machine (CMM), such as that disclosed in U.S. Pat. No. 6,518,996, which is hereby incorporated by reference.

Several companies worldwide manufacture non-contact range sensors. One example of such a sensor is found in the DRS-500 (Digital Range Sensor 500) manufactured by assignee Quality Vision International, Inc., of Rochester, N.Y. Additional examples include the Conoprobe 1000 conoscopic holography-based non-contact, single-point measuring sensor by Optical Metrology, Ltd., (a.k.a. Optimet) of Jerusalem, Israel, the CHR-150 chromatic confocal sensor by STIL SA of Aix-en-Provence, France, and the LT-9000 laser confocal displacement meter by Keyence Corporation of Osaka, Japan. The different sensors of the prior art are configured to operate over a set range. Sensor ranges can be from tens of microns to a few millimeters, each range having an attendant resolution. Such prior art systems can provide long range capability with low resolution or short range capability with high resolution. However, there are times when long range capability would be very useful coupled with high resolution measurement. Current commercial arrangements do not provide a way to operate with both simultaneously.

To increase the range of use, yet still provide high resolution measurements, the system of embodiments disclosed herein has at least two different sensor systems that can be used sequentially or simultaneously, at least two of which operate in different resolutions and ranges. In a preferred embodiment, a very high resolution, but short range sensor, is combined with a lower resolution, but longer range sensor. Thus, embodiments provide a low resolution range sensor system that can operate in a first range of, for example (but not exclusively), about 0.5 mm, and a very high resolution range system that can operate in a second range of, for example (but not exclusively), 10 µm. The low resolution system can employ a position sensitive detector (PSD) in embodiments, or a linear CCD array detector in embodiments, in a triangulation optical system, which sensors allow for longer range detection and measurement. The high resolution system can use a dual photo diode detector (DPD) in another triangulation optical system. Other sensor types can be used in both the long range and short range sensor arrangements, though the PSD, CCD array, and DPD are here preferred.

The dual resolution optical system of embodiments can be configured in at least two ways. In a first configuration, a beam splitter splits the return beam and simultaneously sends the return beam components to both the long range sensor detector(s) and the short range sensor detector(s). In a second configuration, the system can alternate between the long range and short range sensor detectors, which allows more light to arrive at the respective sensor detectors.

DESCRIPTION

As used herein, the term "reflection," as well as "reflect" and other conjugations and variants thereof, includes both diffuse and scattered reflection. Also, when referring to a surface toward which radiation is directed, it should be noted that such surface can be planar, non-planar, the surface of a three-dimensional object, or even a surface embedded in at least a partially radiation transmissive material.

Figure 1:
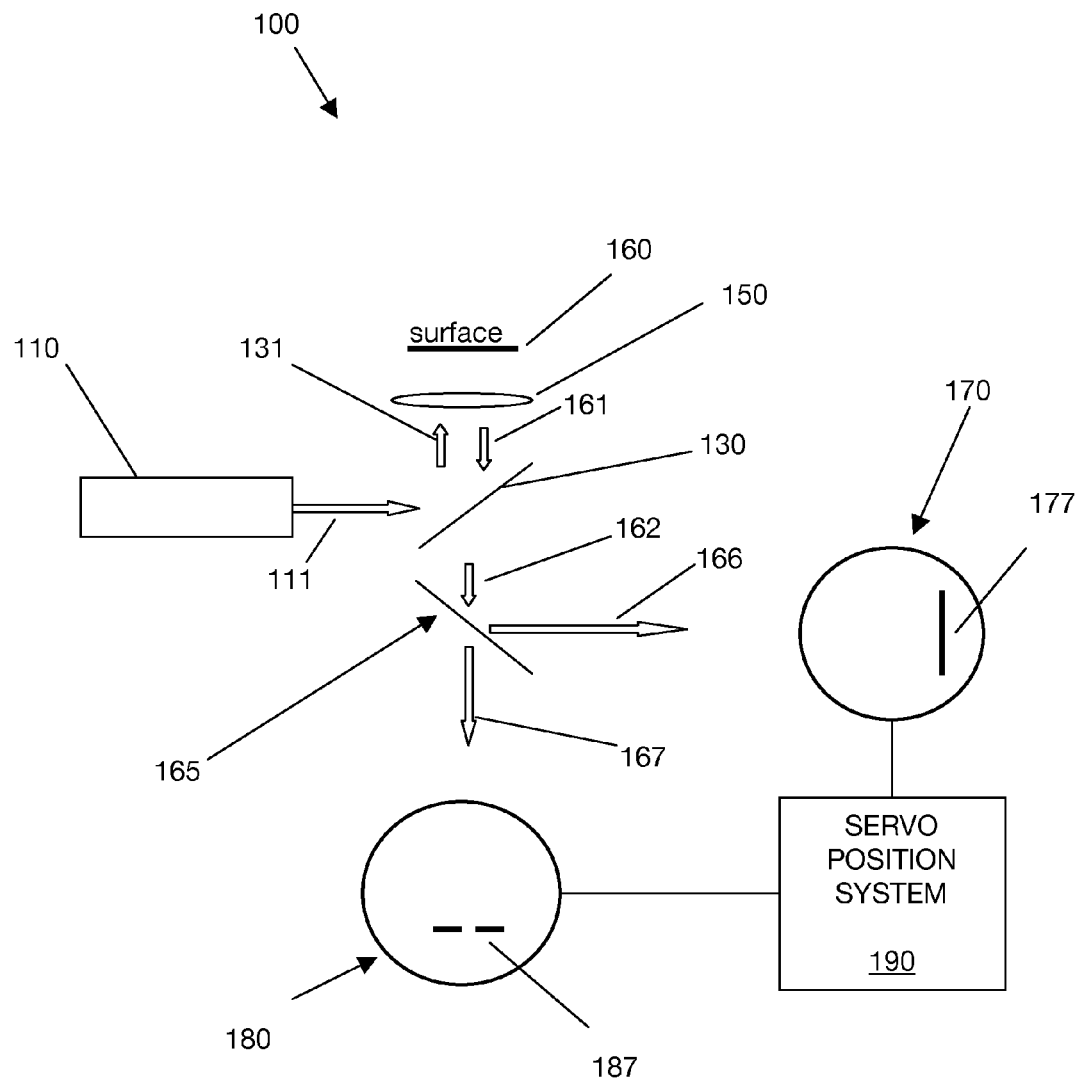
FIG. 1 is a schematic illustration of a dual-resolution detection arrangement in an opto-electronic metrology system in which two sensor systems of different resolutions receive portions of a return beam simultaneously according to embodiments.

Referring to FIG. 1, the opto-electronic metrology detection arrangement 100 includes an illumination source 110 providing an initial illumination beam of appropriate frequency and coherency or incoherency for the particular type of range sensor. Preferably, the illumination beam is at least one frequency of light or electromagnetic radiation in the visible portion of the electromagnetic spectrum.

The initial illumination beam from the illumination source 110 enters the optical system and a portion 131 of the initial illumination beam, is deflected by an optical beam splitter 130. The optical beam splitter 130 sends the illumination portion 131 to an objective lens 150, which converges the illumination portion to a surface or object 160 to be inspected, such as the surface of a three-dimensional object or a surface embedded in a material that is at least partially transmissive of the illumination. The converged illuminating radiation portion hits the object surface 160 and is reflected as reflected radiation 161 back toward the optical system where it travels through a collection optical system, such as the objective lens 150 and the optical beam splitter 130. As indicated above, the reflected light can include diffuse and specular reflected components.

The beam splitter 130 transmits a portion of the reflected radiation 161 to form a returning beam 162. In a first configuration, the returning beam 162 continues on and passes to a second beam splitter 165 that splits the returning beam 162 into two beams 166, 167, that each travel toward a respective detection system 170, 180. Preferably, one or both of the detection systems 170, 180, is/are connected to a servo position system 190 that can move one or both of the sensor systems or one or more components thereof, such as a sensor or measurement head, in accordance with instructions from a controller of the machine. Additionally, the servo position system 190 can be arranged to move the entire opto-electronic module, as seen in and discussed below with respect to FIG. 4.

The beam splitter 165 sends the first beam 166 to the first detection system 170, in this example the lower resolution, longer range sensor system. The range of the lower resolution sensor system is preferably on the order of millimeters. It should be noted that the actual range and resolution of both the low and high resolution sensor systems depends on the numerical aperture of the objective lens. For example a dual resolution device operating with a 0.2 N.A. objective can provide 0.5 mm range and 10 um range respectively for the low and high resolution detection systems. When the same detection systems are used with a 0.45 N.A. objective lens the corresponding measurement range is about 0.08 mm and 4 μm respectively. The preceding values of N.A. and range are exemplary only and are not to be taken as limiting in any way, shape, or form. For example, the longer range can be as small as about 0.05 mm or as large as about 5 mm, and anywhere between about 0.05 mm and about 5 mm. A particular preferred range is about 0.5 mm, though other ranges can be employed as indicated above. The longer range sensor system can, for example, employ the principles of a triangulation sensor, such as is taught in U.S. Pat. Nos. 4,595,829 and 6,288,786, which are hereby incorporated by reference, and use a PSD photodetector or a linear array CCD photodetector, though other suitable types of sensors can be employed.

Similarly, the second beam 167 is sent to the second detection system 180, in this example the higher resolution, shorter range sensor system. The range of the higher resolution sensor system is preferably on the order of micrometers. For example, the range can be as small as about 4 μm or as large as about 100 μm, and anywhere between about 4 μm and about 100 μm. A particular preferred range is about 10 μm, though other ranges can be used as indicated above. The shorter range sensor system can also employ the principles of triangulation, and can use a dual photo diode (DPD) or split photodiode, though other suitable types of sensors could be employed. While the two detection systems are shown as being perpendicular to each other, other angles of separation can be used. It should also be noted that additional optical elements can be incorporated in any of the optical paths, and that the lens 150 can instead be two separate lenses, one for the illumination radiation and one for the collected radiation. Where a separate lens is used for collected radiation, only that lens would be considered to be part of the collection optical system.

Figure 2:
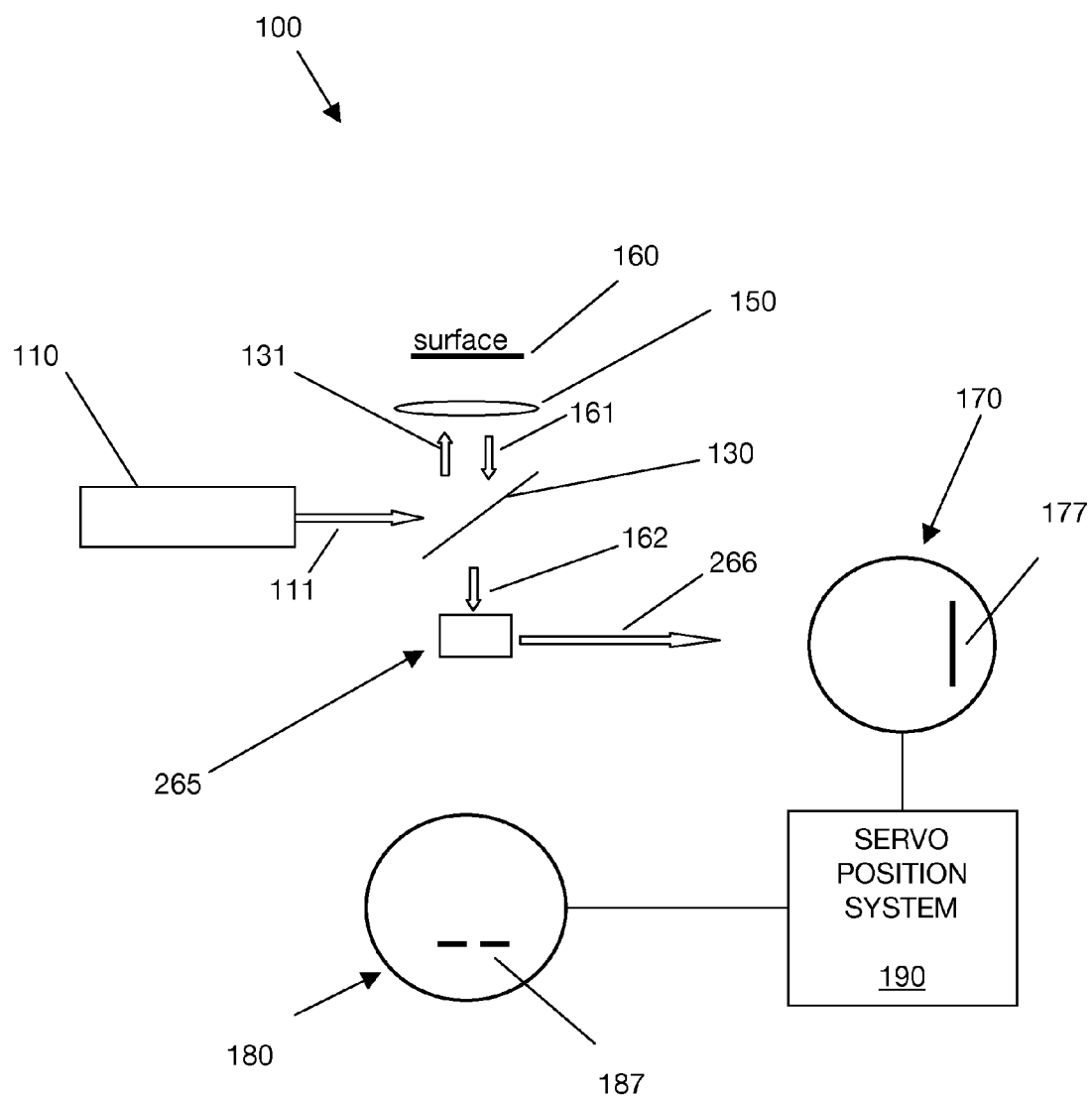
FIG. 2 is a schematic illustration of a dual-resolution detection arrangement in an opto-electronic metrology system in which two sensor systems of different resolutions receive a return beam one at a time, a first of the two systems receiving the return beam according to embodiments.
Figure 3:
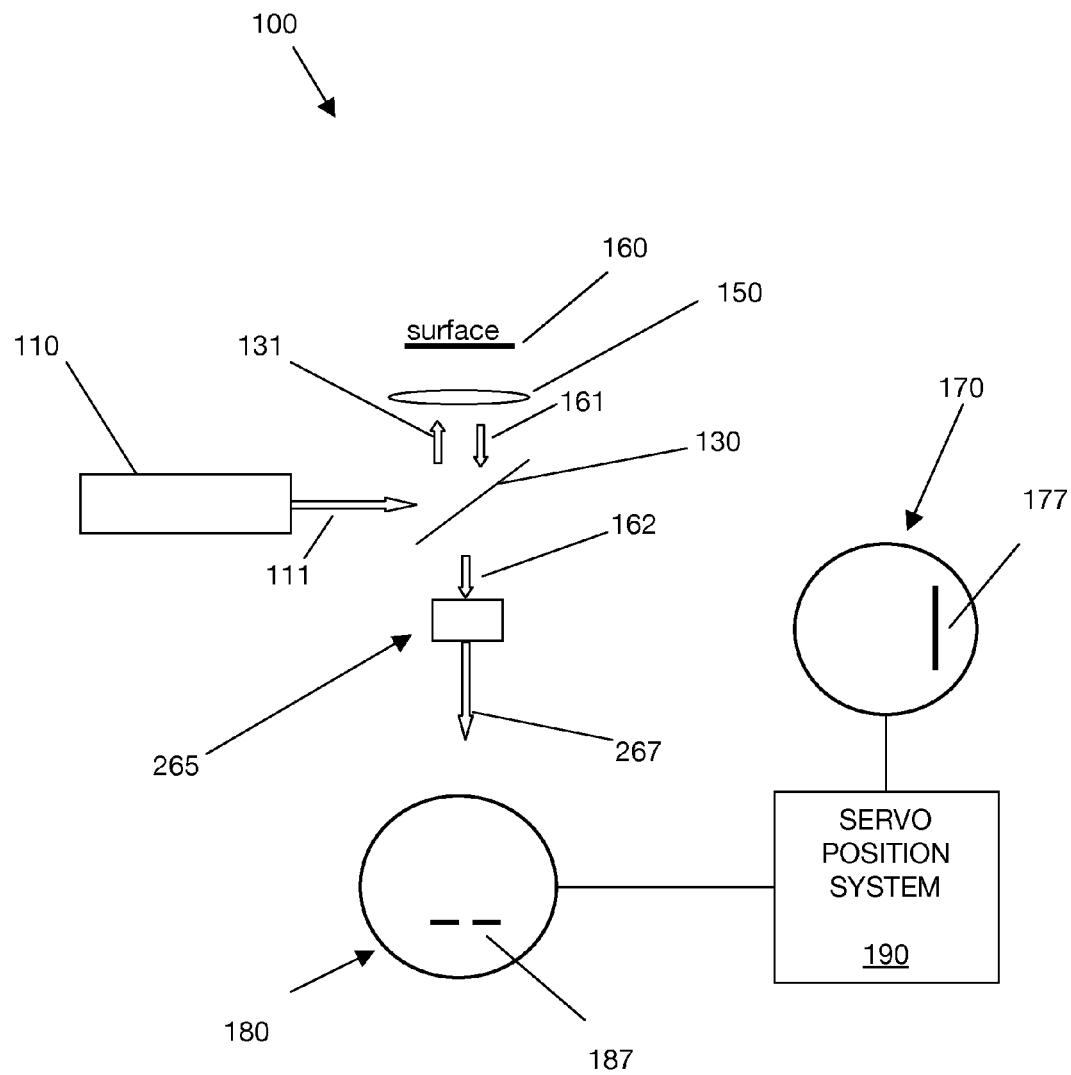
FIG. 3 is a schematic illustration of the dual-resolution detection arrangement in an opto-electronic metrology system in which two sensor systems of different resolutions receive a return beam one at a time as seen in FIG. 2, but with a second of the two systems receiving the return beam according to embodiments.

In a second configuration, as shown in FIGS. 2 and 3, a suitable deflector or optical switch 265 is used in place of the beam splitter 165. The deflector or optical switch 265 deflects or switches all of the light into either beam 266 and on to the first detection system 170 or into beam 267 and on to the second detection system 180 of FIG. 3. In this way more light is provided to one detection system at a time. The returning light 162 is thus directed to the low resolution detection system 170 for its operation alone, or alternately to the short range high resolution detection system 180 for its use alone.

Figure 4:
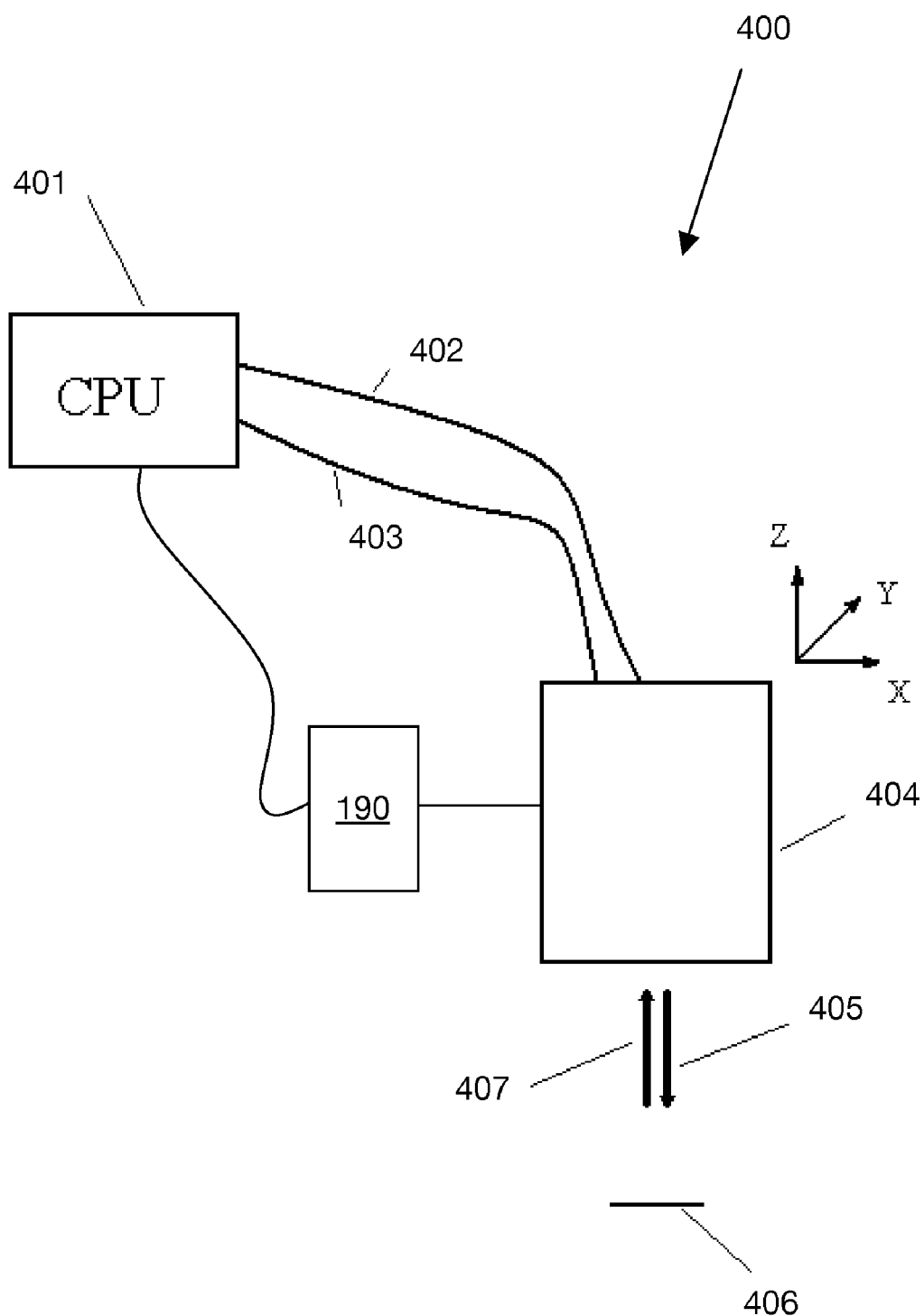
FIG. 4 is a schematic illustration of an electronic detection arrangement in an opto-electronic metrology system using a dual-resolution range detection arrangement according to embodiments, the electronic arrangement receiving signals from the sensor apparatus.

A schematic representation 400 of the opto-electronic metrology system of embodiments, such as those seen in FIGS. 1-3, is shown in FIG. 4. The opto-electronic metrology system includes a CPU controller 401 connected to signals 402, 403 produced by the opto-electronic module 404, which itself includes the illumination source, lenses, deflectors, and detectors schematically illustrated in FIGS. 1-3. The opto-electronic module 404 thus emits illumination 405 to the surface being measured 406, which reflects illumination 407 back toward the opto-electronic module 404. The reflected illumination 407 is received by the opto-electronic module 404 and sent to one or more detection systems within. The opto-electronic module 404 sends the low resolution signal 402 and the high resolution signal 403 to the CPU controller 401. The CPU controller 401 uses the signal 402 and/or 403 to measure the surface and optionally provides feedback control for relative multi-axis motion between the opto electronic module 404 and the surface being measured 406. The CPU controller also preferably controls the servo position system 190 of the opto-electronic module 404 or one or more components thereof.

There are several ways that a measurement system 404 and controller 401, such as those shown in FIG. 4, can use the low resolution, long range sensor and the high resolution, short range sensor. For example, the system can employ at least four modes of operation. In a first mode of operation, the system controller 401 uses only one of the signals 402, 403.

In a second mode of operation, the system controller 401 uses data from the long range, low resolution signal 402 while finding and approaching the surface to be measured 406 and moves the measuring head, or alternately the surface being measured, into the range of the high resolution sensor for a high resolution measurement.

In a third mode of operation, the system controller 401 performs the functions of the previous second mode of operation, but then, when in range of the high resolution sensor system, servo tracks the sensor measuring axis, such as, for example the Z-axis of a X-Y-Z axis CMM machine, or the like, onto a null or fixed value from the high resolution sensor system. As is known, servo tracking moves the sensor and object relative to each other. The system then scans the object 406 along a path with translation and rotational motion or any combination of the preceding to obtain a high resolution Z-profile of the object. This mode is particularly attractive when the high resolution sensor range is very small, for example 10 μm. Alternatively, the servo position system could servo track an axis, such as, for example, the Z-axis of a X-Y-Z axis CMM machine, or the like, onto a null or fixed value from the low resolution sensor. The system then scans the object 406 along a path with translation and rotational motion or any combination of the preceding to obtain a low resolution Z-profile of the object.

In a fourth mode of operation, the system controller 401 performs the scan described in the third mode of operation using the low resolution signal 402, then having this lower resolution, for example Z-axis, profile stored in memory, rescans the object following this stored Z-axis profile data, and collects the high resolution sensor output through the high resolution signal 403 to provide a high resolution profile measurement.

Figure 5:
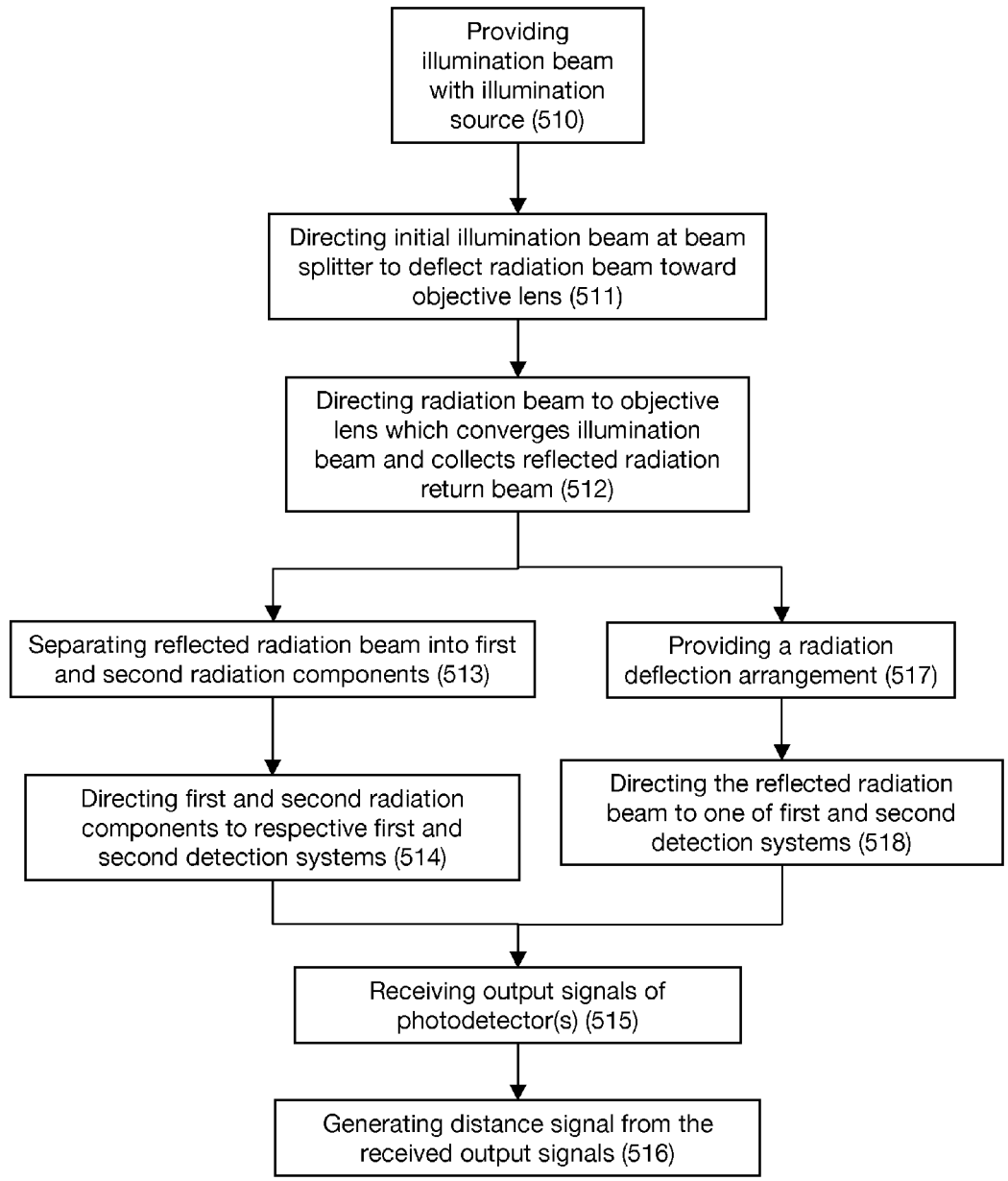
FIG. 5 is a schematic flow diagram of a method according to embodiments.

As seen in FIG. 5, a method of operation according to embodiments comprises providing an illumination beam with an illumination source (block 510), directing the initial illumination beam to a beam splitter to deflect at least part of the illumination beam toward an objective lens of the multi-axis machine (block 511), the objective lens converging light towards the object and then collecting the light that is reflected into a return beam (block 512). At least two paths can be followed at this point. In a first path, the method proceeds by separating the return radiation beam into multiple components (block 513) and directing each component to a respective detection system (block 514). In a second path, the method includes providing a radiation deflection arrangement (block 517) and directing the return radiation beam to one of the detection systems (block 518). Whether the radiation beam is directed at one detection system or separated into components that are each directed at respective detection systems, the method proceeds by receiving output signals of the detection systems (block 515) and generating a distance signal based on the received output signals (block 516).

Figure 6:
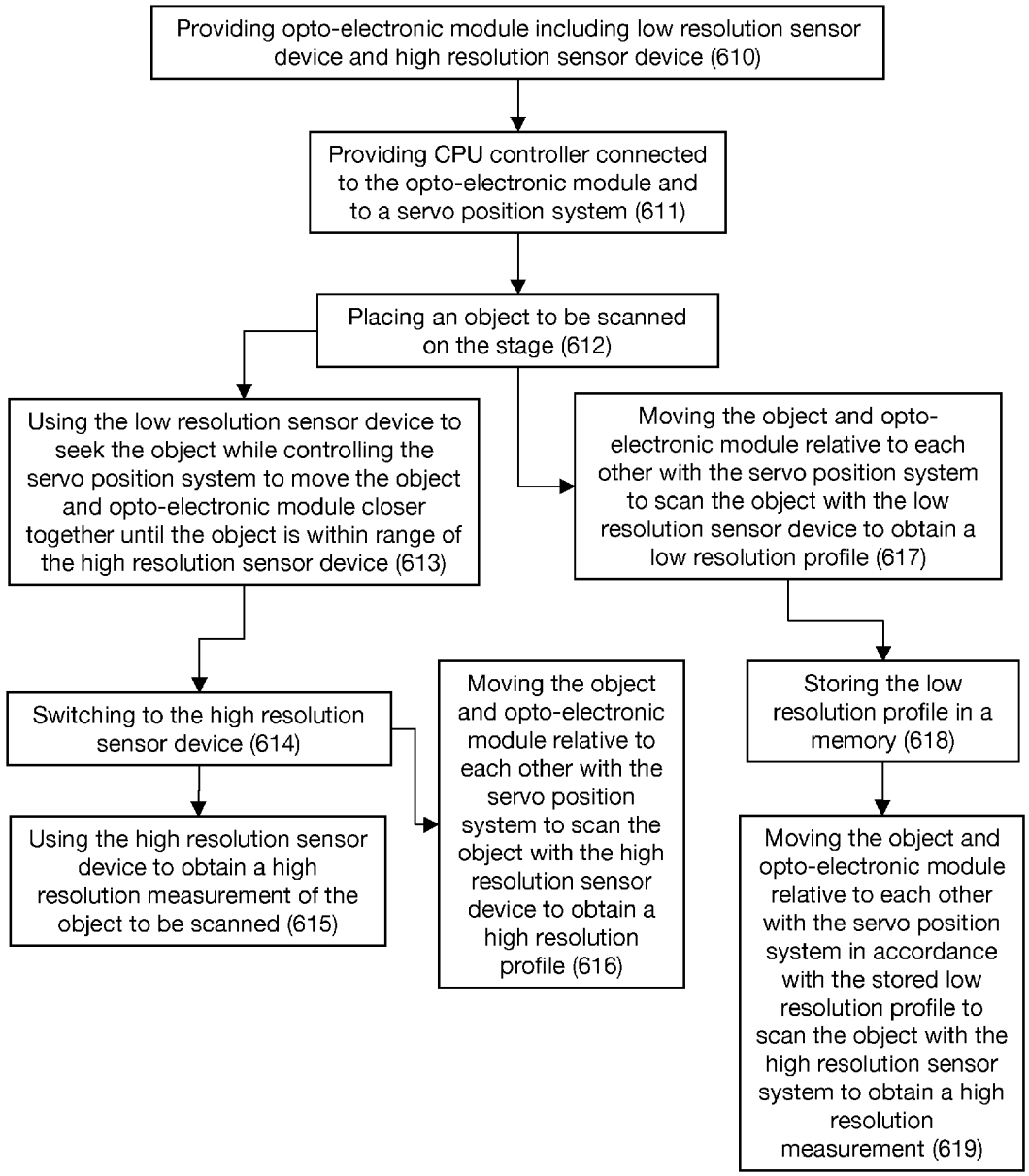
FIG. 6 is a schematic flow diagram of a method according to embodiments.

Additionally, a method of dual resolution measurement as schematically illustrated in FIG. 6 can comprise providing an optical metrology apparatus with an opto-electronic module including a low resolution sensor system and a high resolution sensor system (block 610), providing a CPU controller as part of the optical metrology apparatus connected to the opto-electronic module and to a servo position system of the metrology apparatus (block 611), and placing an object to be scanned on a stage of the apparatus (block 612). At this point, the method bifurcates to represent the different modes of operation. In the first operating mode, the method includes employing one of at least the first and second sensor systems to generate a distance signal.

In particular, the method performs the second mode by using the low resolution sensor system to seek the object while controlling the servo position system to move the stage and opto-electronic module closer together until the object is within range of the high resolution sensor system (block 613), switching to the high resolution sensor system (block 614), and performing a high resolution measurement of the object with the high resolution sensor system to obtain a high resolution measurement of the object (block 615). Alternatively, reflecting the third mode of operation, the method can include moving the object and opto-electronic module relative to each other with the servo position system to scan the object with the high resolution sensor system to obtain a high resolution profile (block 616) after switching to the high resolution sensor system. The fourth mode of operation is reflected by including, after placing the object on the stage, moving the object and opto-electronic module relative to each other with the servo position system to scan the object with the low resolution sensor system to obtain a low resolution profile (block 617), storing the low resolution profile in a memory (block 618), and moving the object and opto-electronic module relative to each other with the servo position system in accordance with the stored low resolution profile to scan the object with the high resolution sensor system to obtain a high resolution measurement (block 619).

It will be appreciated that various of the above-disclosed and other features and functions, or alternatives thereof, may be desirably combined into many other different systems or applications. It will also be noted that various presently unforeseen or unanticipated alternatives, modifications, variations or improvements therein may be subsequently made by those skilled in the art which are also intended to be encompassed by the following claims.

What is claimed is:

1. A multi-resolution, multi-sensor detection apparatus in an optical imaging system that detects a returning radiation beam from a radiation-reflecting surface for measuring distances to the surface, the detection apparatus comprising:

an illuminator that selectively emits at least one initial illumination beam toward an optical system that converges the at least one initial illumination beam onto the radiation-reflecting surface, the at least one converging initial illumination beam reflecting off the radiation-reflecting surface as at least one returning radiation beam traveling to and passing through a front objective lens;

a beam redirecting structure being arrangeable for redirecting at least a portion of each returning radiation beam into each at least two respective detection systems;

at least two detection systems arranged to detect the respective at least a portion of each returning radiation beam;

a first of the at least two detection systems comprising a lower resolution detection system operating in a first range of distances to the radiation-reflecting surface;

a second of the at least two detection systems comprising a higher resolution detection system operating in a portion of the first range of distances to the radiation-reflecting surface; and an electronic circuit system which receives the measured signal from each of the detection systems and derives at least one distance signal.

2. The apparatus of claim 1 wherein each of at least the first and second detection systems has a different respective range detection device to provide a multi-resolution capability.

3. The apparatus of claim 1 wherein the beam redirecting structure splits each returning radiation beam into at least two radiation beams and directs the radiation beams to at least the first and second detection systems, thereby allowing simultaneous detection by the detection systems.

4. The apparatus of claim 1 wherein the beam redirecting structure directs the returning radiation beam to one of at least the first and second detection systems, thereby allowing detection of substantially all of the returning radiation beam by one of at least the first and second detection devices at a time.

5. The apparatus of claim 1 wherein the first detection system is a position sensing detector.

6. The apparatus of claim 1 wherein the first detection system is a CCD detector.

7. The apparatus of claim 1 wherein the second detection system is a dual photo detector.

8. The apparatus of claim 1 wherein the first range is from about 0.05 mm to about 5 mm.

9. The apparatus of claim 8 wherein the first range is about 0.5 mm.

10. The apparatus of claim 1 wherein the second range is from about 4 µm to about 100 µm.

11. The apparatus of claim 10 wherein the second range is about 10 µm.

12. The apparatus of claim 1 wherein the electronic circuit system comprises at least two independent electronic circuit subsystems, each receiving a respective measured signal from a respective one of the at least two detection systems.

13. A range signal generating method comprising:

providing a multi-resolution, multi-sensor detection apparatus in an optical imaging system that detects radiation in a returning radiation beam from a radiation-reflecting surface for measuring distances to the surface, the detection apparatus including:

an illumination source that selectively emits at least one initial illumination beam toward an optical system;

an objective lens arranged to converge the at least one initial illumination beam toward the radiation-reflecting surface, the at least one converged initial illumination beam reflecting off the radiation-reflecting surface as at least one returning radiation beam traveling to and passing through a collection optical system;

a beam redirecting structure arranged to redirect at least a portion of each returning radiation beam into each at least two respective detection systems;

at least two detection systems arranged to detect the respective at least a portion of each returning radiation beam;

a first of the at least two detection systems operating in a first range of distances to the radiation-reflecting surface;

a second of the at least two detection systems operating in a second range of distances to the radiation-reflecting surface; and an electronic circuit system which receives the measured signal from said detection systems and derives at least one distance signal; and providing a first operating mode including:
splitting each returning reflected radiation beam with the beam redirecting structure into at least two radiation beams;
directing simultaneously the at least two radiation beams to at least the first and second detection systems, thereby allowing simultaneous detection by at least the first and second detection systems; and
receiving with the electronic circuit system the measured output signals of all of the at least two sensor systems and generating a distance signal.

14. A range signal generating method comprising:
providing a multi-resolution, multi-sensor detection apparatus in an optical imaging system that detects radiation in a returning radiation beam from a radiation-reflecting surface, the detection apparatus including:
an illumination source that selectively emits at least one initial illumination beam toward an optical system;
an objective lens arranged to converge the at least one initial illumination beam toward the radiation-reflecting surface, the at least one converged initial illumination beam reflecting off the radiation-reflecting surface as at least one returning radiation beam traveling to and passing through a collection optical system;
a beam redirecting structure arranged to redirect at least a portion of each returning radiation beam into at least one respective detection system;
at least two detection systems arranged to detect the respective at least a portion of each returning radiation beam;
a first of the at least two detection systems operating in a first range;
a second of the at least two detection systems operating in a second range; and
an electronic circuit system which receives the measured signal from said detection systems and derives at least one distance signal;
providing a first operating mode including:
splitting each returning reflected radiation beam with the beam redirecting structure into at least two radiation beams;
directing simultaneously the at least two radiation beams to at least the first and second detection systems, thereby allowing simultaneous detection by at least the first and second detection systems;
receiving with the electronic circuit system the measured output signals of all of the at least two sensor systems and generating a distance signal; and
providing a second operating mode including:
diverting substantially all of each returning reflected radiation beam with the beam redirecting structure to a single one of at least the first and second detection systems; and
receiving with the electronic circuit system the measured output signals of the one of the at least two detection systems to which the returning radiation beam is redirected and generating a distance signal.

15. The method of claim 14 further comprising a third operating mode including:
providing a servo position system arranged to move at least one of the detection systems;
establishing a threshold value of distance signal for a respective sensor;
employing a sensor until the respective threshold value is reached; and
switching to a next sensor when each threshold is reached.

16. The method of claim 15 wherein the method is performed in a multi-axis machine and the third operating mode further comprises:
using the servo position system, servo tracking the multi-axis machine onto a predetermined value from one of the first and second detection systems;
scanning the radiation-reflecting surface to obtain a profile of the object from positional information provided by the multi-axis machine combined with the output of the one of the first and second detection systems.

17. The method of claim 16 wherein the one of the first and second detection systems is a high resolution detection system.

18. The method of claim 16 wherein the one of the first and second detection systems is a low resolution detection system.

19. The method of claim 15 wherein the method is performed in a multi-axis machine and the method further comprising a fourth operating mode further including:
using the servo position system, servo tracking the multi-axis machine onto a predetermined value from a low resolution detection system of the first and second detection systems;
scanning the radiation-reflecting surface with the low resolution detection system to obtain a low resolution profile of the object from positional information provided by the multi-axis machine combined with the output of the low resolution detection system;
storing the low resolution profile in a memory; and
scanning the radiation-reflecting surface in accordance with the stored low resolution profile with a high resolution of the first and second detection systems to obtain a high resolution profile of the object from positional information provided by the multi-axis machine combined with the output of the high resolution detection system.

20. A multi-resolution, multi-sensor detection apparatus in an optical imaging system that detects a returning radiation beam from a radiation-reflecting surface for measuring distances to the surface, the detection apparatus comprising:
an illuminator that selectively emits at least one initial illumination beam toward an optical system that converges the at least one initial illumination beam onto the radiation-reflecting surface, the at least one converging initial illumination beam reflecting off the radiation-reflecting surface as at least one returning radiation beam traveling to and passing through a front objective lens;

a beam redirecting structure arranged to redirect at least a portion of each returning radiation beam into at least one respective detection system;

at least two detection systems arranged to detect the respective at least a portion of each returning radiation beam;

a first of the at least two detection systems comprising a lower resolution detection system operating in a first range of distances to the radiation-reflecting surface, the first range being about from about 0.05 mm to about 5 mm;

a second of the at least two detection systems comprising a higher resolution detection system operating in a portion of the first range, the second range of distances to the radiation-reflecting surface being from about 4 μm to about 100 μm;

each of at least the first and second detection systems having a different respective range detection device to provide a multi-resolution capability; and an electronic circuit system which receives the measured signal from each of the detection systems and derives at least one distance signal.

21. The apparatus of claim 20 wherein the beam redirecting structure splits each returning radiation beam into at least two radiation beams and directs the radiation beams to at least the first and second detection systems, thereby allowing simultaneous detection by the detection systems.

22. The apparatus of claim 20 wherein the beam redirecting structure directs the returning radiation beam to one of at least the first and second detection systems, thereby allowing detection of substantially all of the returning radiation beam by one of at least the first and second detection devices at a time.

23. The apparatus of claim 20 wherein the electronic circuit system comprises at least two independent electronic circuit subsystems, each receiving a respective measured signal from a respective one of the at least two detection systems.

* * * * *